(12) United States Patent
Mukherjee

(10) Patent No.: US 11,805,549 B2
(45) Date of Patent: *Oct. 31, 2023

(54) SRS CARRIER BASED SWITCHING ON UNLICENSED BANDS

(71) Applicant: Telefonaktiebolaget LM Ericsson (publ), Stockholm (SE)

(72) Inventor: Amitav Mukherjee, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/584,204

(22) Filed: Jan. 25, 2022

(65) Prior Publication Data
US 2022/0150963 A1   May 12, 2022

Related U.S. Application Data

(63) Continuation of application No. 16/319,002, filed as application No. PCT/IB2017/054400 on Jul. 20, 2017, now Pat. No. 11,259,321.
(Continued)

(51) Int. Cl.
*H04W 74/08* (2009.01)
*H04L 5/00* (2006.01)
(Continued)

(52) U.S. Cl.
CPC ......... *H04W 74/0808* (2013.01); *H04L 5/001* (2013.01); *H04L 5/005* (2013.01);
(Continued)

(58) Field of Classification Search
CPC .......... H04W 74/0808; H04W 72/0453; H04L 5/0051; H04L 25/0226; H04L 27/2607
See application file for complete search history.

(56) References Cited

U.S. PATENT DOCUMENTS 10,200,904 B2   2/2019  Zhang et al.
11,259,321 B2 * 2/2022  Mukherjee ............ H04L 5/0051
(Continued)

FOREIGN PATENT DOCUMENTS

| CN | 104065466 A | 9/2014 |
|---|---|---|
| CN | 105357162 A | 2/2016 |
| WO | 2016048227 A2 | 3/2016 |

OTHER PUBLICATIONS

Ericsson, "R4-164222: Scenarios for SRS carrier based switching for LTE," 3GPP TSG-RAN WG4 #79, May 23-27, 2016, Nanjing, China, 3 pages.
(Continued)

*Primary Examiner* — Ivan O Latorre
*Assistant Examiner* — Won Tae C Kim
(74) *Attorney, Agent, or Firm* — Withrow & Terranova, PLLC

(57) ABSTRACT

Systems and methods related to switched carrier Sounding Reference Signal (SRS) transmission in unlicensed spectrum are disclosed. In some embodiments, a method of operation of a User Equipment device (UE) in a wireless system comprises performing uplink Listen-Before-Talk (LBT) on one or more candidate carriers for switched carrier SRS transmission and performing a switched carrier SRS transmission on at least one candidate carrier of the one or more candidate carriers that is determined to be available as a result of performing the uplink LBT on the one or more candidate carriers. In some embodiments, the one or more candidate carriers are carriers other than carriers configured for the UE and on which the UE is scheduled to transmit.

24 Claims, 13 Drawing Sheets

Related U.S. Application Data

(60) Provisional application No. 62/364,454, filed on Jul. 20, 2016.

(51) Int. Cl.
  *H04W 72/23* (2023.01)
  *H04L 25/02* (2006.01)
  *H04L 27/26* (2006.01)
  *H04W 16/14* (2009.01)
  *H04W 72/0453* (2023.01)

(52) U.S. Cl.
  CPC ........ *H04L 5/0051* (2013.01); *H04L 25/0226* (2013.01); *H04L 27/2607* (2013.01); *H04W 16/14* (2013.01); *H04W 72/0453* (2013.01); *H04W 72/23* (2023.01)

(56) References Cited

U.S. PATENT DOCUMENTS

| | | |
|---|---|---|
| 2011/0243066 A1 | 10/2011 | Nayeb Nazar et al. |
| 2014/0247802 A1* | 9/2014 | Wijting ............. H04W 72/0453 370/329 |
| 2016/0050667 A1* | 2/2016 | Papasakellariou .... H04L 1/1812 370/329 |
| 2016/0182201 A1 | 6/2016 | Jiang et al. |
| 2016/0219619 A1 | 7/2016 | Guo |
| 2017/0164352 A1* | 6/2017 | Yang ..................... H04W 16/14 |
| 2017/0324528 A1 | 11/2017 | Rico Alvarino et al. |
| 2018/0213530 A1 | 7/2018 | Mochizuki et al. |
| 2019/0132103 A1 | 5/2019 | Yang et al. |
| 2019/0246427 A1 | 8/2019 | Mukherjee |
| 2020/0322119 A1 | 10/2020 | Matsumura et al. |

OTHER PUBLICATIONS

Ericsson, "R4: 164223: UE RF issues related to SRS carrier based switching for LTE," 3GPP TSG-RAN WG4 #79, May 23-27, 2016, Nanjing, China, 5 pages.

ETSI, "5 GHZ RLAN; Harmonised Standard covering the essential requirements of article 3.2 of Directive 2014/53/EU," ETSI EN 301 893 V2.1.1, May 2017, European Telecommunications Standards Institute, 122 pages.

IEEE Computer Society, "IEEE Standards for Information Technology—Telecommunications and information exchange between systems, Local and metropolitan area networks—Specific requirements, Part 11: Wireless LAN Medium Access Control (MAC) and Physical Layer (PHY) Specifications," IEEE Standard 802.11—2016, The Institute of Electrical and Electronics Engineers, Inc., 3,534 pages.

Restriction Requirement for U.S. Appl. No. 16/319,002, dated Feb. 10, 2020, 9 pages.

Non-Final Office Action for U.S. Appl. No. 16/319,002, dated May 14, 2020, 14 pages.

Final Office Action for U.S. Appl. No. 16/319,002, dated Oct. 13, 2020, 19 pages.

Advisory Action for U.S. Appl. No. 16/319,002, dated Dec. 23, 2020, 3 pages.

Non-Final Office Action for U.S. Appl. No. 16/319,002, dated Mar. 3, 2021, 9 pages.

Final Office Action for U.S. Appl. No. 16/319,002, dated Jul. 12, 2021, 9 pages.

Notice of Allowance for U.S. Appl. No. 16/319,002, dated Oct. 14, 2021, 10 pages.

First Office Action for Chinese Patent Application No. 201780044643.8, dated Apr. 1, 2021, 13 pages.

Intention to Grant for European Patent Application No. 17758621.1, dated Mar. 18, 2020, 5 pages.

Extended European Search Report for European Patent Application No. 20190769.8, dated Sep. 23, 2020, 11 pages.

Invitation to Pay Additional Fees and Partial International Search for International Patent Application No. PCT/ B2017/054400, dated Oct. 26, 2017, 13 pages.

International Search Report and Written Opinion for International Patent Application No. PCT/IB2017/054400, dated Dec. 19, 2017, 17 pages.

\* cited by examiner

SRS CARRIER BASED SWITCHING ON UNLICENSED BANDS

RELATED APPLICATIONS

This application is a continuation of U.S. patent application Ser. No. 16/319,002, filed Jan. 18, 2019, now U.S. Pat. No. 11,259,321 B2, which is a national stage application of International Patent Application No. PCT/IB2017/054400, filed Jul. 20, 2017, which claims the benefit of provisional patent application Ser. No. 62/364,454, filed Jul. 20, 2016, the disclosures of which are hereby incorporated herein by reference in their entireties.

TECHNICAL FIELD

Sounding Reference Signal (SRS), SRS carrier based switching, Long Term Evolution (LTE) unlicensed carriers, License Assisted Access (LAA), MulteFire, Fifth Generation (5G) New Radio (NR) in unlicensed spectrum.

BACKGROUND

The ongoing standalone Long Term Evolution (LTE) in Unlicensed spectrum forum (MulteFire) and Third Generation Partnership Project (3GPP) Release (Rel) 14 work item on uplink License Assisted Access (LAA) allows LTE User Equipment devices (UEs) to transmit on the uplink in the unlicensed 5 gigahertz (GHz) or license-shared 3.5 GHz radio spectrum. These uplink transmissions generally need to perform Listen-Before-Talk (LBT) prior to accessing the channel. There is also an ongoing 3GPP Rel-14 work item on Sounding Reference Signal (SRS) Carrier Based Switching (SCBS). How SCBS is implemented in LAA and MulteFire and unlicensed spectrum LTE in general is an open issue.

Today, the unlicensed 5 GHz spectrum is mainly used by equipment implementing the IEEE 802.11 Wireless Local Area Network (WLAN) standard, also known under its marketing brand as "Wi-Fi."

LTE uses Orthogonal Frequency Division Multiplexing (OFDM) in the downlink and Discrete Fourier Transform (DFT)-spread OFDM (also referred to as Single-Carrier Frequency Division Multiple Access (SC-FDMA)) in the uplink. The basic LTE downlink physical resource can thus be seen as a time-frequency grid as illustrated in FIG. 1, where each Resource Element (RE) corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 milliseconds (ms), each radio frame consisting of ten equally-sized subframes of length $T_{SUBFRAME}=1$ ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 microseconds (µs) (including cyclic prefix).

Furthermore, the resource allocation in LTE is typically described in terms of Resource Blocks (RBs), where a RB corresponds to 12 contiguous subcarriers in the frequency domain. RBs are numbered in the frequency domain, starting with 0 from one end of the system bandwidth.

In LTE, the uplink transmissions are dynamically scheduled, i.e., in each downlink subframe the base station transmits control information about which terminals should transmit data to the enhanced or evolved Node B (eNB) in subsequent subframes, and upon which RBs the data is transmitted. The uplink resource grid is comprised of data and uplink control information in the Physical Uplink Shared Channel (PUSCH), uplink control information in the Physical Uplink Control Channel (PUCCH), and various reference signals such as Demodulation Reference Signals (DMRSs) and SRSs. An example uplink subframe is shown in FIG. 3. Note that uplink DMRS and SRS are time-multiplexed into the uplink subframe, and SRSs are always transmitted in the last symbol of a normal uplink subframe. DMRSs are used for coherent demodulation of PUSCH and PUCCH data. The PUSCH DMRS is transmitted once every slot for subframes with normal cyclic prefix, and is located in the fourth and eleventh SC-FDMA symbols.

The subframes in which SRSs are transmitted by any UE within a cell are indicated by cell-specific broadcast signaling. A 4-bit cell-specific 'srsSubframeConfiguration' parameter indicates 15 possible sets of subframes in which SRS may be transmitted within each radio frame. As noted before, the SRS transmissions are always in the last SC-FDMA symbol in the configured uplink subframes, and PUSCH transmission may not be permitted on these symbols.

SRS is not associated with any data or control information but is generally used to estimate the uplink channel quality for purposes of frequency-selective scheduling. In order to serve this purpose, it is necessary that SRSs from different UEs with different sounding bandwidths can overlap. As illustrated in FIG. 3, interleaved Frequency Division Multiple Access (FDMA) is used for SRS with a repetition factor of 2, which implies that in the configured SRS bandwidth, the SRS will be mapped to every other subcarrier in a comb-like fashion. This allows multiple UEs to simultaneously transmit SRS without overlap. The SRS sequence spans at least four RBs, and the maximum allowed bandwidth of one SRS is dependent on the uplink system bandwidth and the cell-specific parameter srs-BandwidthConfig, $C_{SRS} \in \{0, 1, \ldots, 7\}$. For example, for an uplink system bandwidth of 110 RBs and $C_{SRS}=0$, the maximum possible SRS bandwidth for a particular UE is 96 RBs. A 2-comb (SRS on every other subcarrier) or 4-comb (SRS on every fourth subcarrier) can be configured for SRS in Rel-13 LTE.

Furthermore, different phase or cyclic shifts can be applied to SRS sequences on the same REs to make them mutually orthogonal, with up to eight such UE-specific shifts currently available per comb. Thus, up to 16 distinguishable full-bandwidth SRS sequences can currently be assigned to UEs. Up to six symbols of contiguous SRS transmission are supported in Rel-13 LTE, for example in the Uplink Pilot Time Slot (UpPTS) region of a special subframe.

In Rel-14 LTE, a new 3GPP Work Item is ongoing regarding SRS carrier based switching. The basic objective is as follows:

To support SRS switching to and between TDD [Time Division Duplexing) component carrier(s), where the component carriers available for SRS transmission correspond to the component carriers available for carrier aggregation of PDSCH [Physical Downlink Shared Channel], while the UE has fewer component carriers available for carrier aggregation of PUSCH.

Therefore, UEs that are capable of uplink data transmission on a limited number of component carriers (e.g., two uplink component carriers can be used for PUSCH) can use SCBS to transmit SRS on many more Component Carriers (CCs). This is very beneficial since current UEs are limited to a maximum of two uplink CCs for PUSCH transmission, whereas the number of downlink CCs can be as large as 32 in Rel-13 LTE. By configuring SCBS, the eNB can exploit downlink-uplink channel reciprocity and enhance downlink beamforming or scheduling on carriers for which the UE is unable to transmit PUSCH. However, this Work Item is mainly focused on CCs in licensed spectrum. For SRS carrier based switching, the SRS transmission opportunities include:

In at least one symbol out of up to six symbols in a special subframe

In the last symbol of an uplink subframe

Furthermore, both aperiodic and periodic SRS are supported for SCBS.

Up to now, the spectrum used by LTE is dedicated to LTE. This has the advantage that the LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 4, a UE is connected to a Primary Cell (PCell) in the licensed band and one or more Secondary Cells (SCells) in the unlicensed band. In this application an SCell in unlicensed spectrum is denoted as an LAA SCell.

SRS in 3GPP Rel-14 enhanced LAA (eLAA) will be based on the legacy comb design as in Rel-13 LTE. SRS when transmitted with PUSCH is located in symbol 13 of the uplink subframe. When SRS without PUSCH is transmitted in downlink ending partial subframes, the UE transmits SRS in symbol 13. The existing maximum number of SRS RBs is retained for a given system bandwidth in eLAA. No shifting of SRS is used on an LAA SCell. Only aperiodic SRS transmission is supported in eLAA. If the triggering for SRS without PUSCH is received in subframe n, the UE should send SRS without PUSCH in subframe n+k (not considering the LBT failure). The offset parameter k is indicated by three bits in the downlink grant, where "000" represents no triggering for SRS without PUSCH; "001"-"111" represents SRS without PUSCH is transmitted in subframe n+4 to n+11, respectively.

A new industry forum has been initiated on extending LTE to operate entirely on unlicensed spectrum in a stand-alone mode, which is referred to as "MulteFire" in marketing terms. There is no licensed carrier for essential control signal transmissions and control channels. Hence, the transmission needs to be carried on the unlicensed spectrum with no guaranteed channel access availability and also fulfill the regulatory requirements on the unlicensed spectrum.

The use of a carrier in an unlicensed spectrum should be done in a fair and equal manner for different devices. One component when securing this fair sharing is to have requirements on how to distribute transmissions over the system bandwidth. Here, two requirements are commonly found in regulations:

1. Occupied channel bandwidth
2. Maximum Power Spectral Density (PSD)

For example, both these requirements are enforced for 5 GHz carriers according to ETSI 301 893, while only the maximum PSD requirements are enforced in the US regulation for 5 GHz.

The occupied bandwidth requirement is expressed as the bandwidth containing 99% of the power of the signal, shall be between 80% and 100% of the declared Nominal Channel Bandwidth. Our current understanding of this requirement is that it is tested over a time interval longer than one subframe (1 ms). The frequency allocations for one UE must thus vary between subframes in such a way that the requirement is fulfilled. It is still an open issue if this requirement needs to be fulfilled for a UE which only transmits in a single subframe, such as Physical Random Access Channel (PRACH) or with a single PUSCH.

Maximum PSD requirements exist in many different regions. For most cases the requirement is stated with a resolution bandwidth of 1 megahertz (MHz). For example, the ETSI 301 893 specification requires 10 decibel-milli-watts (dBm)/MHz for 5150-5350 MHz. The implication of the PSD requirement on the physical layer design is that, without proper designs, a signal with small transmission bandwidth will be limited in transmission power. This can negatively affect coverage of the operation. That is, the maximum PSD requirement is a binding condition that requires changes to uplink transmissions in unlicensed spectrums.

3GPP has adopted interlaced transmissions as a means to give LAA uplink signals with small bandwidth higher transmission powers when needed (and, to a lesser extent, to satisfy the transmission bandwidth requirement). The interlacing of transmissions is done on a per Physical RB (PRB) basis. This design is also referred to as Block-Interleaved FDMA (B-IFDMA). Interlaced uplink transmissions are also used in MulteFire.

One interlace is illustrated in FIG. 5, in a design with five interlaces for an example of 20 MHz system bandwidth with a maximum of 100 RBs available for transmission. As shown, a uniform spread of the RBs is considered, i.e., uniform interlaces where each interlace contains 100/5=20 RBs. The figure to the right shows the first 1.2 MHz of the same allocation. The hashed lines represent example boundaries of the PSD requirement measurement intervals (1 MHz resolution bandwidth). The black stripes represent the allocated RBs for the interlace.

Unlike 3GPP eLAA, the SRS transmissions in MulteFire are also interlaced. In other words, the SRS in MulteFire is different in the frequency domain compared to eLAA, since the eLAA SRS follows the legacy LTE structure. An example of interlace-based SRS in MulteFire is shown in FIG. 6, where the SRS is located in symbol 13 in the time domain and on interlace #0 in the frequency domain.

In MulteFire SRS, comb structure is not supported. Therefore, cyclic shifts and/or Orthogonal Cover Code (OCC) are used to multiplex different antenna ports from a UE, or to multiplex different UEs on the same interlace. Up to four symbols of SRS can be transmitted by a UE in the short PUCCH (sPUCCH) region of a partial downlink Transmit Time Interval (TTI).

In LAA/standalone LTE Unlicensed (LTE-U) uplink, the SRS and SCBS originally designed for LTE on licensed spectrum cannot be reused because of the following problems. First, on unlicensed carriers, channel access operates entirely based on the LBT mechanism. Unlike licensed LTE, the channel access availability for SRSs transmitted on unlicensed carriers is not guaranteed. Second, the SRS multiplexing rules for UEs that are switching SRS to a particular carrier and UEs that can send PUSCH on that carrier will be different for eLAA and MulteFire due to the different SRS structures.

SUMMARY

Systems and methods related to switched carrier Sounding Reference Signal (SRS) transmission in unlicensed spectrum are disclosed. In some embodiments, a method of operation of a User Equipment device (UE) in a wireless system comprises performing uplink Listen-Before-Talk (LBT) on one or more candidate carriers for switched carrier SRS transmission and performing a switched carrier SRS transmission on at least one candidate carrier of the one or more candidate carriers that is determined to be available as a result of performing the uplink LBT on the one or more candidate carriers. In some embodiments, the one or more candidate carriers are carriers other than carriers configured for the UE and on which the UE is scheduled to transmit.

In some embodiments, performing the uplink LBT on the one or more candidate carriers for switched carrier SRS transmission comprises performing the uplink LBT on a candidate carrier, a result of the uplink LBT being that the candidate carrier is available, and performing the switched carrier SRS transmission on the at least one candidate carrier comprises performing the switched carrier SRS transmission on the candidate carrier in response to the result of the uplink LBT being that the candidate carrier is available. In some embodiments, the method further comprises, prior to performing the uplink LBT on the candidate carrier, starting uplink transmission on a first carrier, the first carrier being different than the candidate carrier. In some embodiments, the method further comprises, after performing the switched carrier SRS transmission on the candidate carrier, performing uplink LBT on the first carrier, a result of the uplink LBT on the first carrier being that the first carrier is available and resuming the uplink transmission on the first carrier upon the result of the uplink LBT on the first carrier being that the first carrier is available.

In some embodiments, performing the uplink LBT on the one or more candidate carriers for switched carrier SRS transmission comprises performing multi-carrier uplink LBT on a first set of carriers for which the UE is granted uplink transmission and a second set of carriers comprising the one or more candidate carriers, the first set of carriers and the second set of carriers being disjoint sets, where the at least one candidate carrier on which the UE performs switched carrier SRS transmission comprises at least one candidate carrier from the one or more candidate carriers in the second set of carriers. Further, in some embodiments, performing multi-carrier uplink LBT on the first set of carriers for which the UE is granted uplink transmission and the second set of carriers comprising the one or more candidate carriers comprises suspending uplink transmission on at least one of the carriers in the first set of carriers prior to transmitting SRS on the at least one candidate carrier. In some other embodiments, performing multi-carrier uplink LBT on the first set of carriers for which the UE is granted uplink transmission and the second set of carriers comprising the one or more candidate carriers comprises suspending uplink transmission on all of the carriers in the first set of carriers prior to transmitting SRS on the at least one candidate carrier.

In some embodiments, performing the switched carrier SRS transmission on the at least one candidate carrier comprises performing the switched carrier SRS transmission on the at least one candidate carrier in accordance with an SRS transmission multiplexing configuration for a respective group of UEs such that the switched carrier SRS transmission on the at least one candidate carrier is multiplexed with uplink transmissions of another group of UEs on the same at least one candidate carrier.

In some embodiments, performing the switched carrier SRS transmission on the at least one candidate carrier comprises performing the switched carrier SRS transmission on the at least one candidate carrier in accordance with an SRS transmission multiplexing configuration for a respective group of UEs such that the switched carrier SRS transmission on the at least one candidate carrier is multiplexed with SRS transmission of another group of UEs on the same at least one candidate carrier. Further, in some embodiments, the switched carrier SRS transmissions of the respective group of UEs are multiplexed with the SRS transmissions of another group of UEs in a particular symbol of the same subframe on the same at least one carrier. In some other embodiments, the switched carrier SRS transmissions of the respective group of UEs are multiplexed with the SRS transmissions of another group of UEs using different time-domain Orthogonal Cover Codes (OCCs). In some other embodiments, the switched carrier SRS transmissions of the respective group of UEs are multiplexed with the SRS transmissions of another group of UEs using different time-domain OCCs and different intra-symbol frequency-domain OCCs and cyclic shifts.

In some embodiments, a UE for a wireless system is adapted to perform uplink LBT on one or more candidate carriers for switched carrier SRS transmission and perform a switched carrier SRS transmission on at least one candidate carrier of the one or more candidate carriers that is determined to be available as a result of performing the uplink LBT on the one or more candidate carriers. In some embodiments, the UE is further adapted to operate according to any of the other embodiments of the method of operation of the UE described herein.

In some embodiments, a UE for a wireless system comprises at least one transceiver, at least one processor, and memory comprising instructions executable by the at least one processor whereby the UE is operable to perform uplink LBT on one or more candidate carriers for switched carrier SRS transmission and perform a switched carrier SRS transmission on at least one candidate carrier of the one or more candidate carriers that is determined to be available as a result of performing the uplink LBT on the one or more candidate carriers.

In some embodiments, a UE for a wireless system comprises an uplink LBT module operable to perform uplink LBT on one or more candidate carriers for switched carrier SRS transmission and a switched carrier SRS transmission module operable to perform a switched carrier SRS transmission on at least one candidate carrier of the one or more candidate carriers that is determined to be available as a result of performing the uplink LBT on the one or more candidate carriers.

In some embodiments, a method of operation of a UE in a wireless system comprises receiving an indication of an SRS switching opportunity from a network node and performing one or more switched carrier SRS transmissions in accordance with the indication of the SRS switching opportunity. In some embodiments, the indication of the SRS switching opportunity is any one or any combination of: an indication of a specific subframe in which to attempt SRS Carrier Based Switching (SCBS) on one or more switched carriers, a number of contiguous SRS symbols that are to be transmitted with switching is performed in a downlink partial ending subframe, a set of carriers on which to attempt SRS switching, an indication of one or more uplink interlaces on which the switched SRS transmissions are to be transmitted, a contention-window or Clear Channel Assessment (CCA) duration to be used for uplink LBT for switched SRS transmissions, an indication of whether uplink LBT can be skipped prior to SRS transmission on a switched carrier, and an indication of whether SRS switching is to be triggered to deferred to a next periodic opportunity.

In some embodiments, a UE for a wireless system is adapted to receive an indication of an SRS switching opportunity from a network node and perform one or more switched carrier SRS transmissions in accordance with the indication of the SRS switching opportunity.

In some embodiments, a UE for a wireless system comprises at least one transceiver, at least one processor, and memory comprising instructions executable by the at least one processor whereby the UE is operable to receive an indication of an SRS switching opportunity from a network node and perform one or more switched carrier SRS transmissions in accordance with the indication of the SRS switching opportunity.

In some embodiments, a UE for a wireless system comprises a receiving module operable to receive an indication of an SRS switching opportunity from a network node and a performing module operable to perform one or more switched carrier SRS transmissions in accordance with the indication of the SRS switching opportunity.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
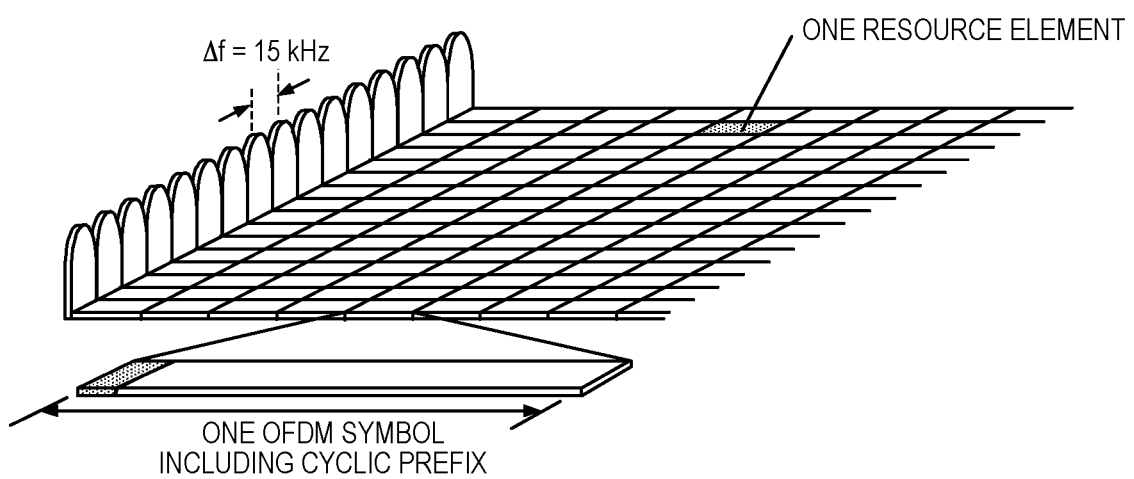
FIG. 1 illustrates a time-frequency grid representing the basic Long Term Evolution (LTE) downlink physical resource.
Figure 2:
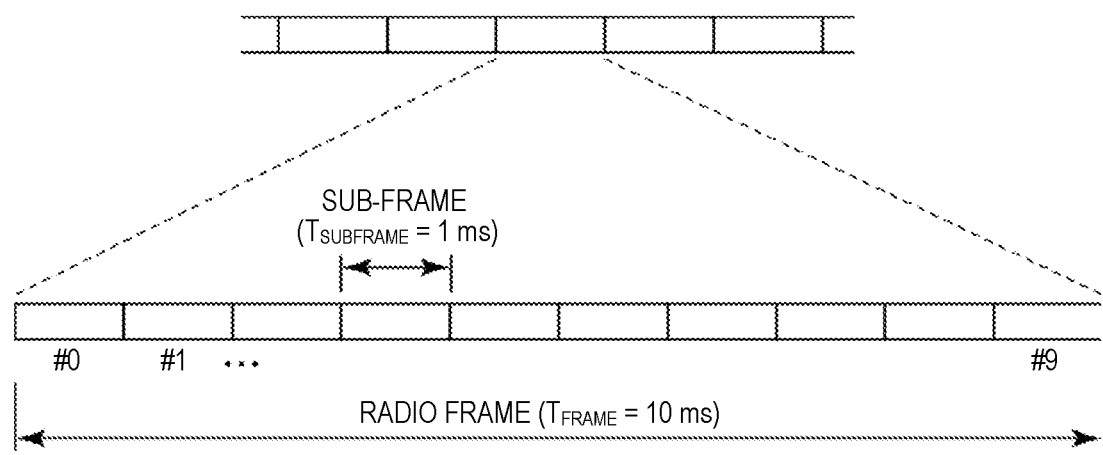
FIG. 2 illustrates an LTE downlink frame structure.
Figure 3:
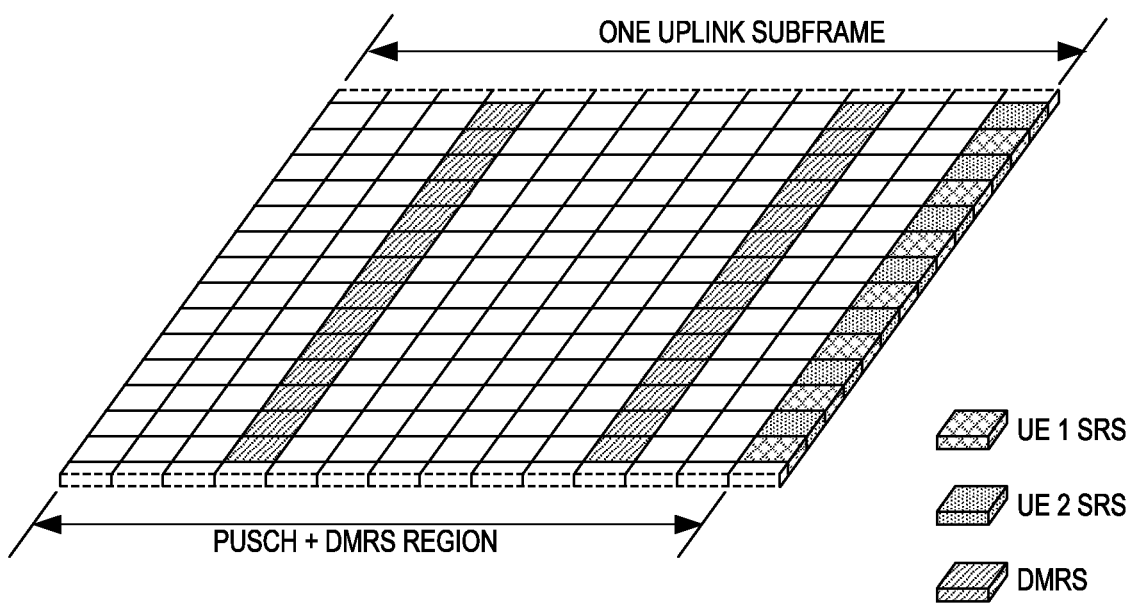
FIG. 3 illustrates an example uplink frame structure in LTE.
Figure 4:
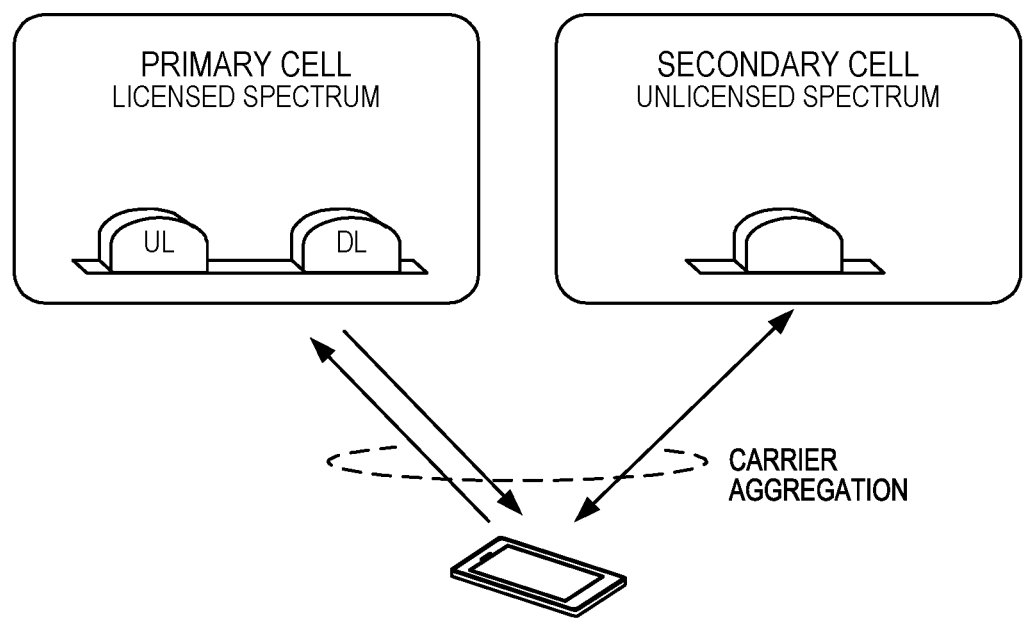
FIG. 4 illustrates License Assisted Access (LAA) to unlicensed spectrum using LTE.
Figure 5:
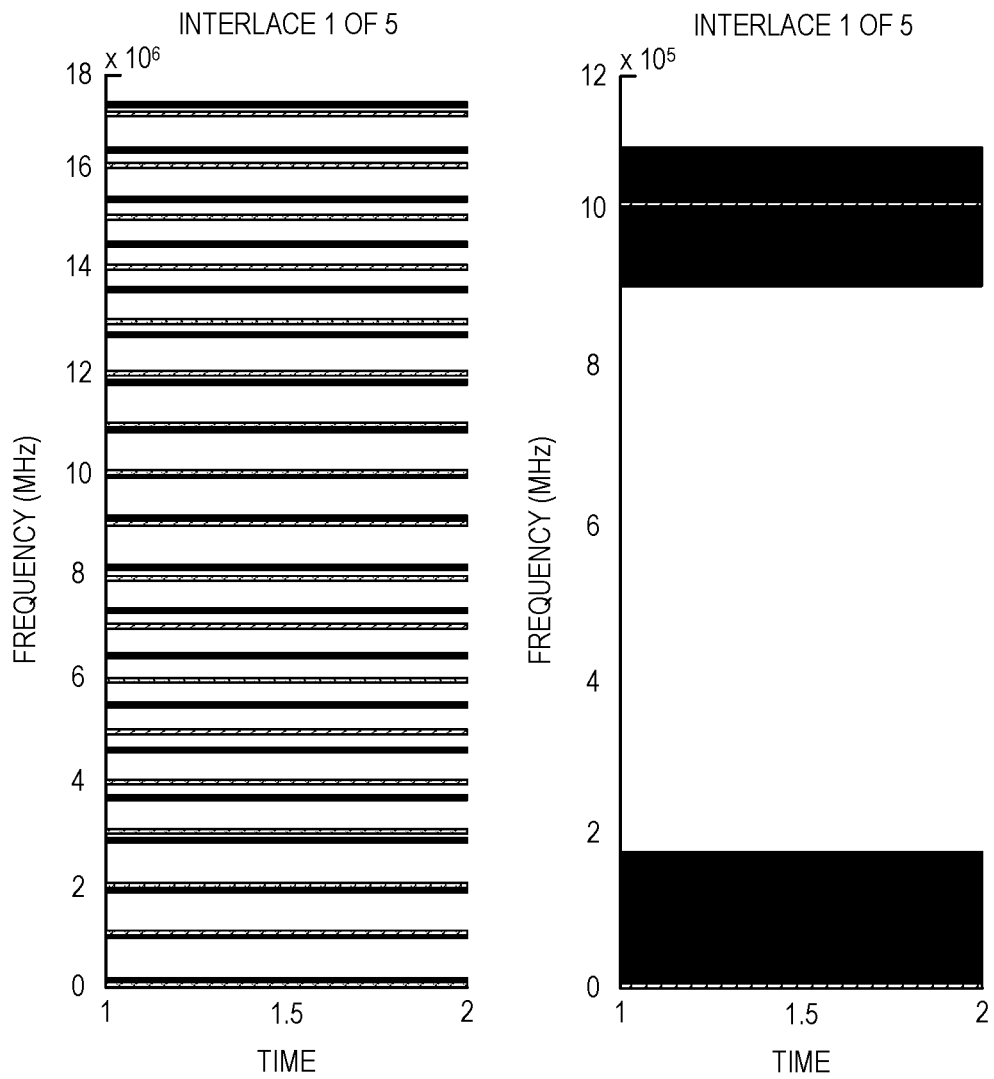
FIG. 5 illustrates one example of an interlace for uplink transmission.
Figure 6:
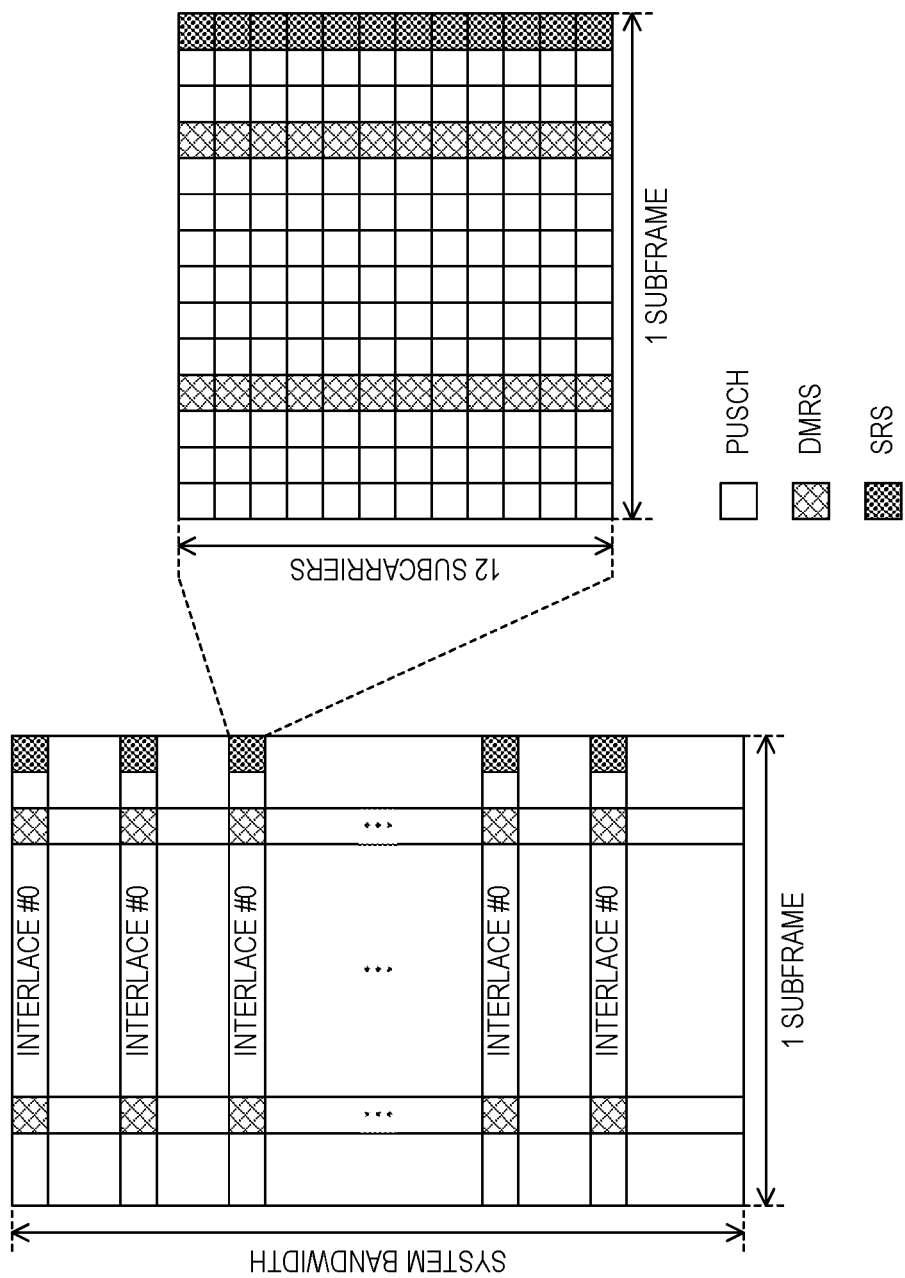
FIG. 6 illustrates an example of interlace-based Sounding Reference Signal (SRS) in MulteFire.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device or User Equipment device (UE): As used herein, a "wireless device" or "UE" is any type of device that has access to (i.e., is served by) a wireless network (e.g., a cellular communications network) by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In this section, the present disclosure will be illustrated in more detail by a number of exemplary embodiments. It should be noted that proposed methods can be applied to different variations of LTE operating in unlicensed spectrum, such as License Assisted Access (LAA) and Multe- Fire, as well as to 5G New Radio (NR) in unlicensed spectrum after appropriate scaling of subcarrier spacing/ Transmit Time Interval (TTI) duration compared to LTE.

The present disclosure describes new designs for Sounding Reference Signal (SRS) carrier based switching in unlicensed spectrum. Two separate cases are considered: legacy SRS as in enhanced LAA (eLAA), and interlaced SRS as applicable to MulteFire.

Embodiments disclosed herein have the following advantages. SRS Carrier Based Switching (SCBS) is enabled on unlicensed carriers. SRS multiplexing rules for UEs that are switching SRS to a particular carrier and UEs that can send Physical Uplink Shared Channel (PUSCH) on that carrier are defined for both eLAA with legacy SRS and MulteFire with interlaced SRS. Efficient rules are defined for the indication of SRS switching opportunities by the LAA/ MulteFire eNB.

Figure 7:
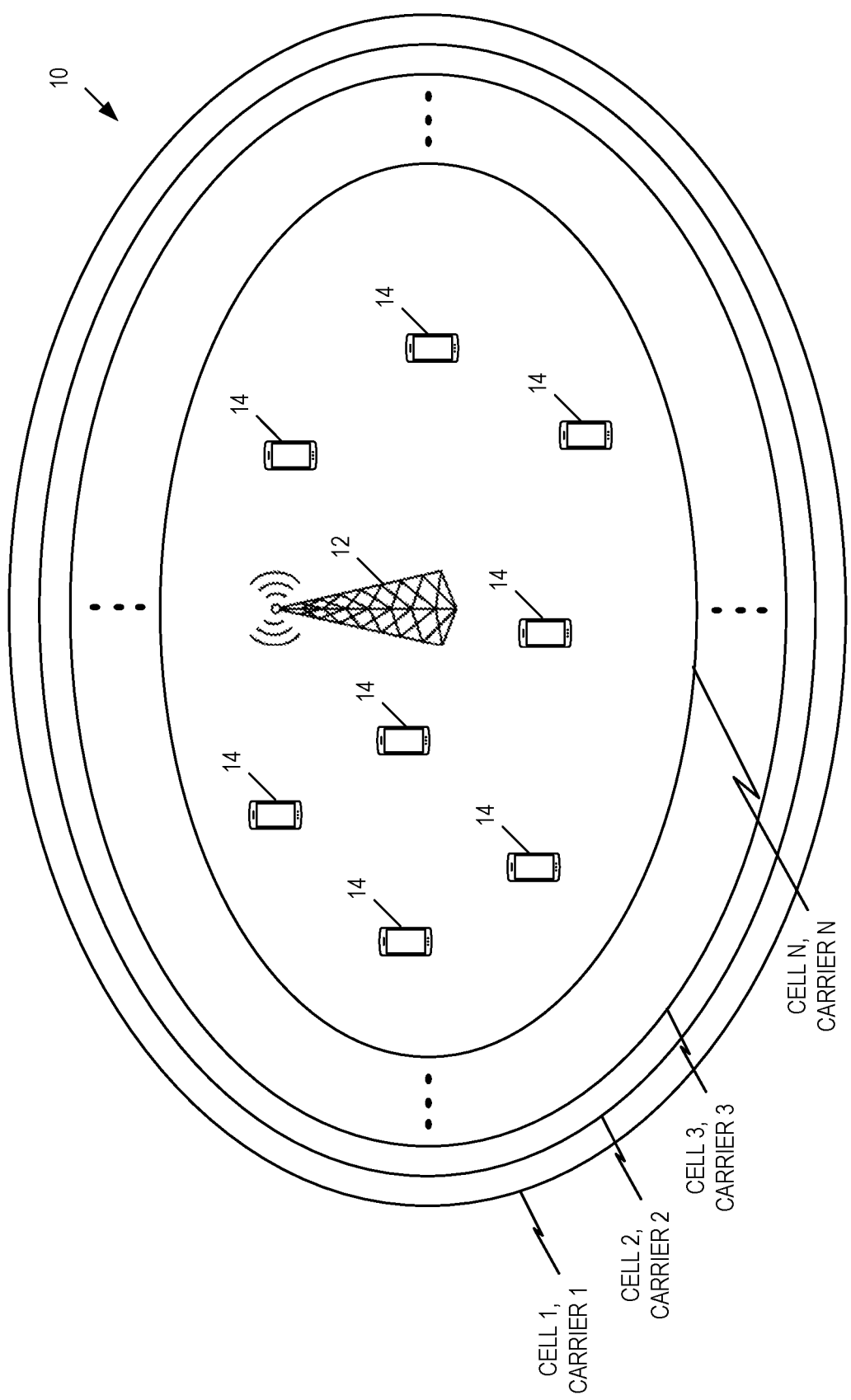
FIG. 7 illustrates one example of a wireless system in which embodiments of the present disclosure may be implemented.

FIG. 7 illustrates one example of a wireless system 10 in which embodiments of the present disclosure may be implemented. The wireless system 10 may be a cellular communications network. The wireless system 10 includes a base station 12 that operates to serve a number of cells (Cell 1 to Cell N) on a number of different carriers (Carrier 1 to Carrier N, respectively). Some or all of the carriers are in an unlicensed frequency spectrum or some other spectrum that requires Listen-Before-Talk (LBT), or carrier sensing, prior to transmission. In this regard, the wireless system 10 may be an LAA system in which at least one of the carriers is in a licensed spectrum and at least some of the other carriers are in an unlicensed spectrum. In other embodiments, the wireless system 10 is a MulteFire or similar system providing standalone operation in an unlicensed frequency spectrum (i.e., the carriers are all in the unlicensed spectrum or standalone operation is provided on at least some of the carriers in an unlicensed spectrum). The base station 12 may be, for example, an eNB in a LTE or LTE-based cellular communications network.

The base station 12 provides wireless access to a number of UEs 14, which may also be referred to herein as wireless devices. Note that while only one base station 12 is illustrated in this example, the cells may alternatively be provided by multiple base stations or radio access nodes.

The first embodiment focuses on the choice of the carrier to which SRS switching is performed. In the first aspect, the choice of which carrier to switch to is based on the outcome of uplink LBT performed by the UE 14 on a set of one or more candidate switching carriers (i.e., one or more of the carriers that are candidates for switching SRS transmission), excluding the carriers on which it is currently configured and scheduled to transmit PUSCH/Physical Uplink Control Channel (PUCCH).

Figure 8:
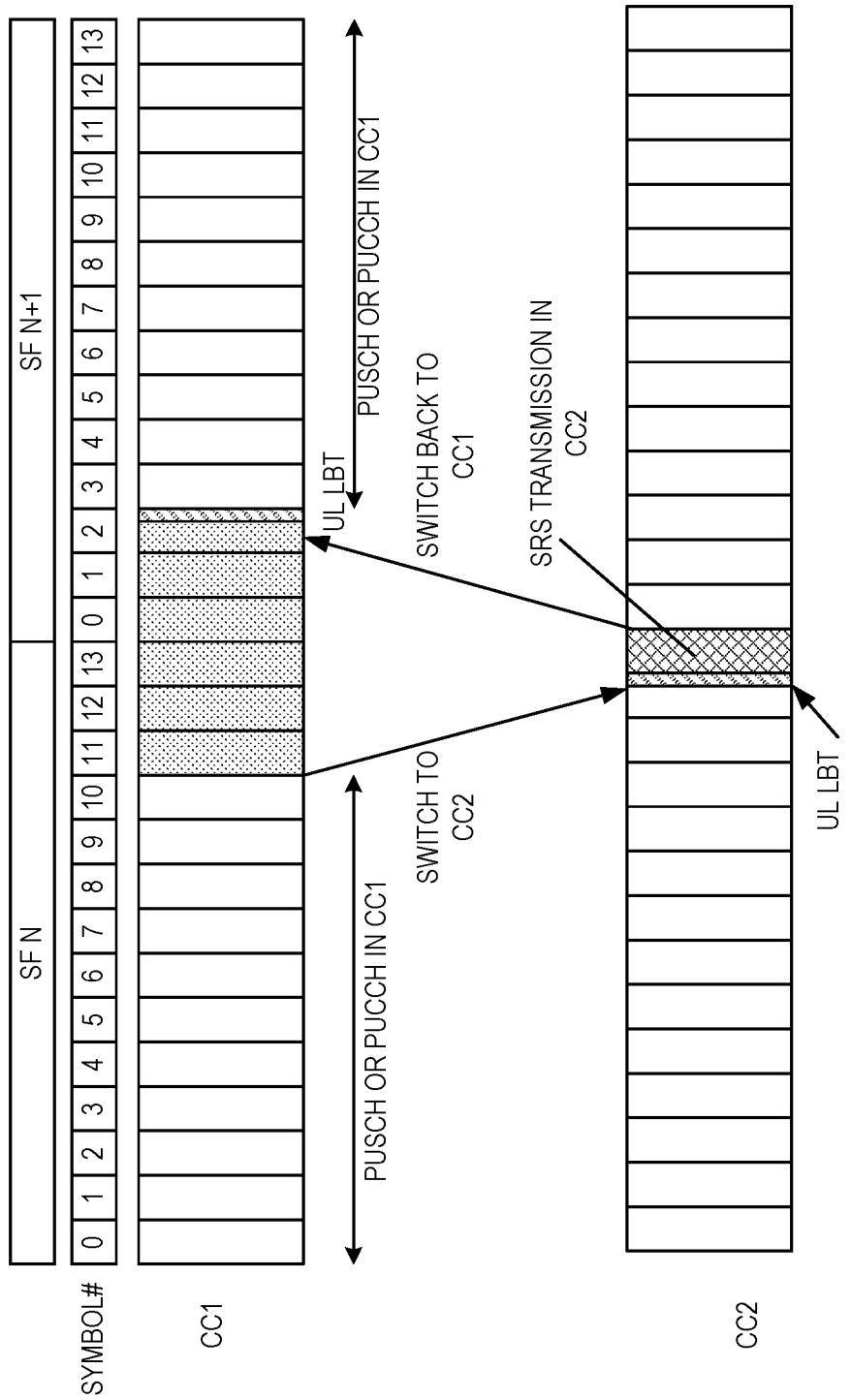
FIG. 8 illustrates a User Equipment device (UE) that is configured to perform Physical Uplink Shared Channel (PUSCH) transmissions on Component Carrier 1 (CC1) according to one embodiment of the present disclosure.

A first example is shown in FIG. 8 where the UE 14 is configured to perform PUSCH transmissions on Component Carrier 1 (CC1). The UE 14 then performs an uplink LBT operation on CC2, which finds the channel to be unoccupied. This is then followed by a switched SRS transmission on CC2, after which the UE 14 switches back to CC1, performs an uplink LBT on CC1, and resumes any PUSCH/PUCCH transmissions that it has been scheduled for. The uplink LBT operation on CC2 may be of a duration that is specified by the base station 12 (e.g., eNB) via broadcast System Information (SI) or configured via higher layer signaling. The subframe in which the UE 14 attempts uplink LBT on CC2 may be determined based on reading Common Physical Downlink Control Channel (C-PDCCH) information from either the serving cell CC1 or CC2, where the C-PDCCH carries information regarding the upcoming downlink-uplink subframe allocation on one or more carriers.

Figure 9:
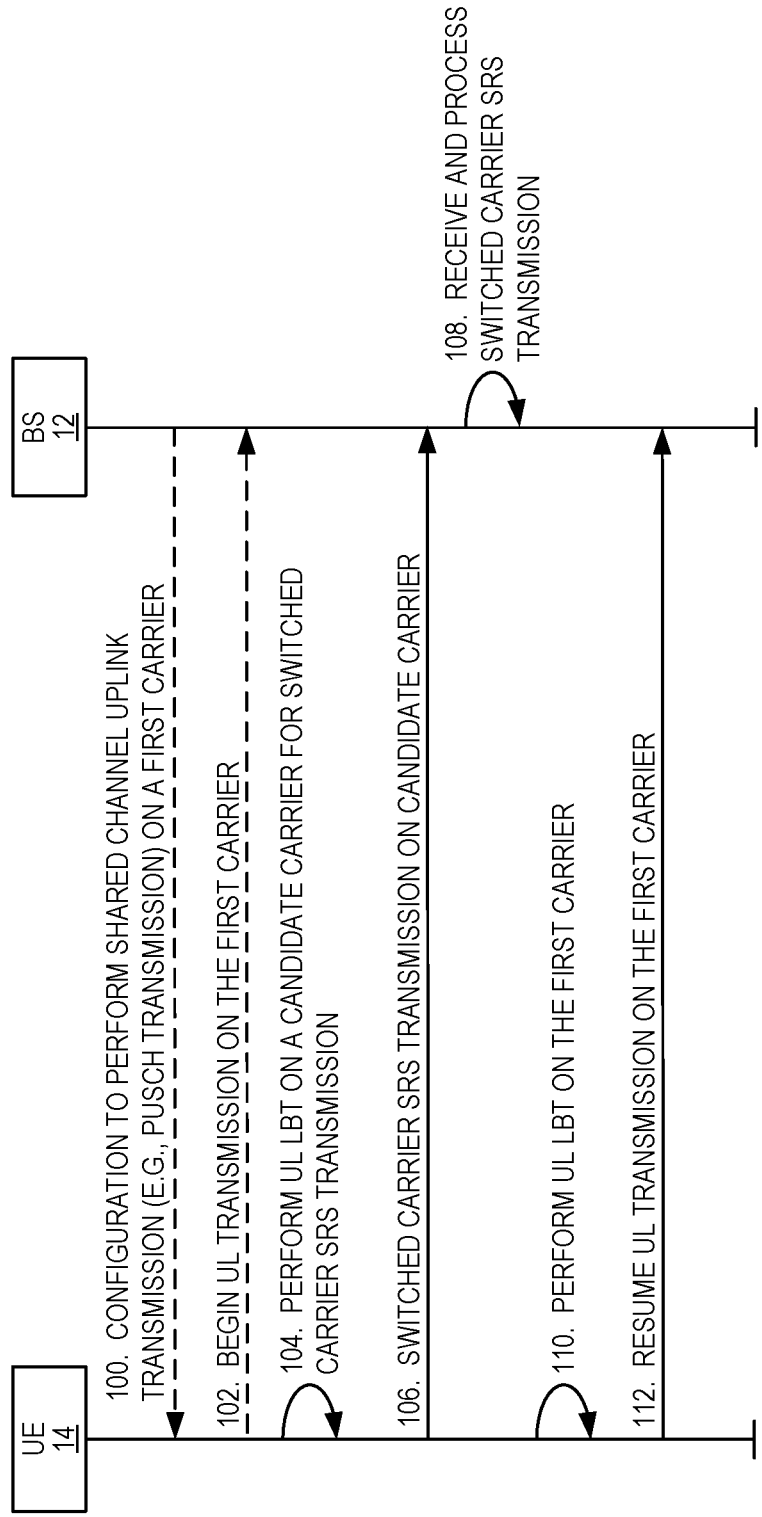
FIG. 9 illustrates one example of the first embodiment of the present disclosure.

One example of the first embodiment of the present disclosure is illustrated in FIG. 9. Optional steps are illustrated by dashed lines. Also, unless otherwise explicitly stated or otherwise required, the steps may be performed in any order. As illustrated, the base station 12 optionally configures the UE 14 to perform shared channel uplink transmission (e.g., PUSCH transmission) on a first carrier (step 100). Optionally, the UE 14 begins uplink transmission on the first carrier according to the configuration of step 100 (step 102). The UE 14 performs uplink LBT on a candidate carrier for switched carrier SRS transmission (step 104). The candidate carrier is a carrier other than the first carrier configured for the UE 14 and on which the UE 14 is scheduled to transmit. In this example, the uplink LBT procedure determines that the candidate carrier is available and, as such, the UE 14 performs a switched carrier SRS transmission on the candidate carrier (step 106). In other words, the UE 14 suspends uplink transmission on the first carrier, switches to the candidate carrier, and transmits SRS on the candidate carrier. The base station 12 receives and processes the switched carrier SRS transmission (step 108). The UE 14 performs uplink LBT on the first carrier (step 110). Upon determining that the first carrier is available, the UE 14 resumes uplink transmission on the first carrier (step 112).

In a second aspect, the uplink LBT on candidate switching carriers is performed together with uplink LBT on carriers for which the UE 14 has received uplink PUSCH/PUCCH grants. For multicarrier uplink LBT, the LBT mechanism can be based on either 'Type A' or 'Type B.' In Type A, independent random backoff is performed on each candidate CC, while in Type B, a full random backoff with multiple Clear Channel Assessment (CCA) slots is performed on a specific carrier, while a quick CCA check (e.g., of duration 25 microseconds (µs)) is performed on all other carriers before the start of transmission on the random backoff carrier. In both types, uplink transmission is performed only on those carriers which are deemed to be unoccupied.

Let S1 denote the set of candidate carriers for SRS switching, and S2 denote the set of carriers for which the UE 14 has received uplink transmission grants, S1 and S2 being mutually exclusive (i.e., S1 and S2 are disjoint sets). The set S1 may be indicated by the serving cell. In the above aspect, the UE 14 performs LBT on both sets S1 and S2 simultaneously. If the LBT mechanism is based on Type B, then the UE 14 performs a full random backoff on one of the carriers in set S2, and utilizes a quick CCA check on all other carriers in S1 and S2. If the LBT mechanism is based on Type A, then the UE 14 utilizes the same Contention Window (CW) for carriers in S1 as the CW used for carriers in S2, where the CW may have been indicated in the uplink grant(s) for S2 by the eNB.

Figure 10:
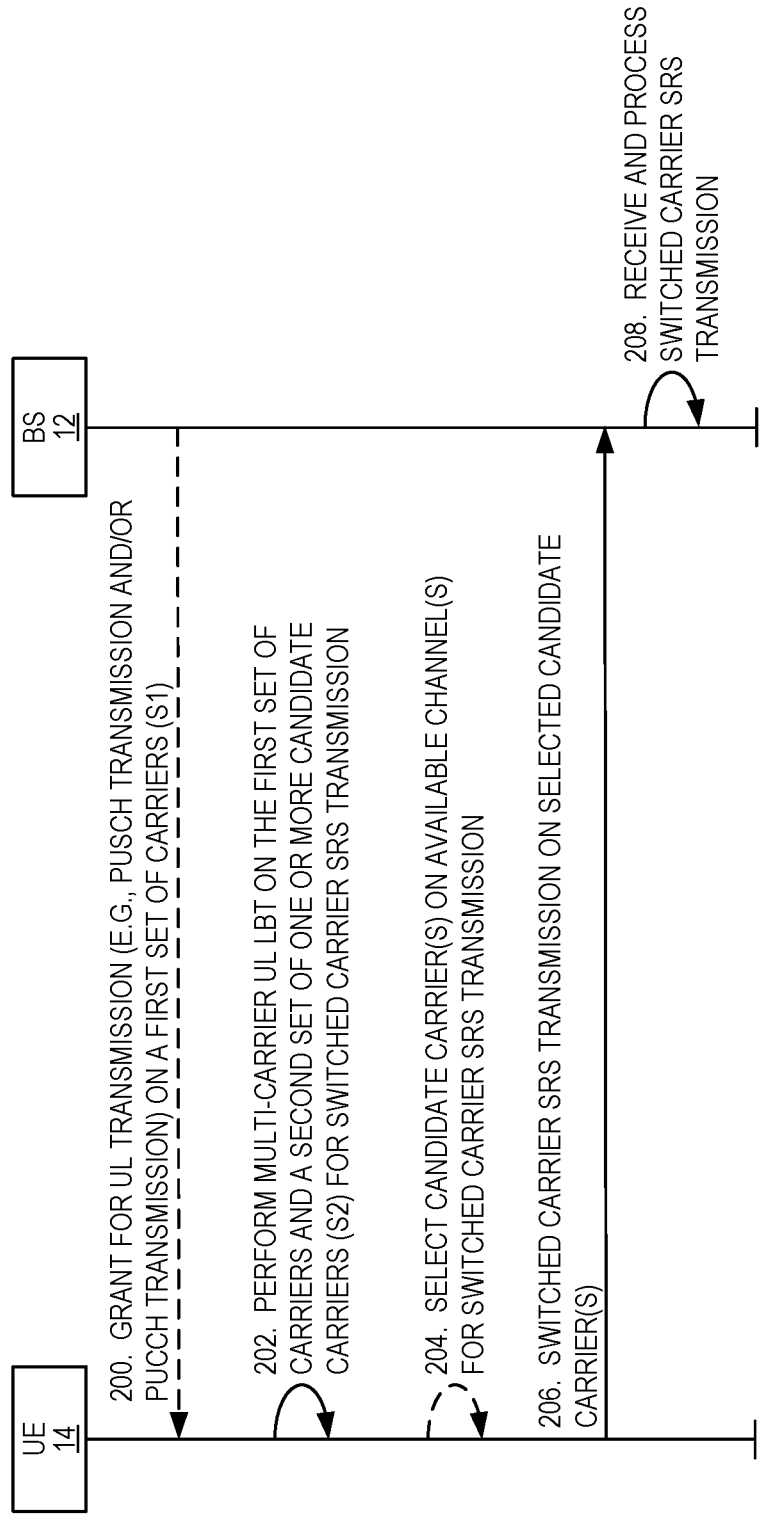
FIG. 10 illustrates one example of the second aspect of the first embodiment of the present disclosure.

One example of the second aspect of the first embodiment of the present disclosure is illustrated in FIG. 10. Optional steps are illustrated by dashed lines. Also, unless otherwise explicitly stated or otherwise required, the steps may be performed in any order. As illustrated, the base station 12 optionally transmits a grant to the UE 14 for uplink transmission on a first set of carriers (S1) (step 200). The grant is, in some embodiments, a grant for a PUSCH transmission and/or a PUCCH transmission. The first set of carriers (S1) includes one or more carriers.

The UE 14 performs multi-carrier uplink LBT on the first set of carriers (S1) and a second set of candidate carriers (S2) for switched carrier SRS transmission (step 202). The second set of candidate carriers (S2) includes one or more carriers. Further, the first and second sets of carriers (S1 and S2) are mutually exclusive. Multi-carrier uplink LBT is a procedure by which the UE 14 simultaneously performs uplink LBT on multiple carriers, where in step 202 these multiple carriers include the carriers in the first and second sets of carriers (S1 and S2). Optionally, the UE 14 selects one or more of the candidate carriers in the second set (S2) that are available, as determined by the multi-carrier uplink LBT procedure, for switched carrier SRS transmission (step 204). The UE 14 performs switched carrier SRS transmission on the (selected) candidate carrier(s) (step 206). Alternatively, the UE 14 may perform switched carrier SRS transmission on all available carriers in the second set (S2). In some embodiments, the UE 14 suspends uplink transmission on at least one and possibly all of the carriers in the first set of carriers (S1) in order to transmit SRS on the (selected) candidate carriers from the second set (S2). The base station 12 receives and processes the uplink switched carrier SRS transmission (step 208).

In some embodiments, multiplexing of switched SRS transmissions is provided. In these embodiments, switched SRS transmissions from UEs that are switching from another CC are multiplexed with ongoing transmissions from UEs configured to use the same CC for their uplink transmissions. As a non-limiting example, consider two groups of UEs, D1 and D2, and an uplink CC, CC1. UEs in group D1 switch from CCs other than CC1 to transmit SRS on CC1, i.e., these UEs perform SCBS. UEs in group D2 are configured for uplink PUSCH, PUCCH, and SRS transmissions on CC1, i.e., they are not performing SCBS.

The first aspect relates to switched SRS multiplexing for eLAA transmissions. In one non-limiting example, the switched SRS transmissions from group D1 UEs are multiplexed with SRS transmissions from group D2 UEs in symbol 13 of the same subframe (uplink or downlink partial ending). The group D2 UEs are configured to transmit SRS without PUSCH, such that a gap is available prior to symbol 13 for uplink LBT by both group D1 and D2 UEs. The switched group D1 SRSs and regular group D2 SRSs are assigned different combs and/or cyclic shifts in order to multiplex them in the same symbol location.

The second aspect relates to switched SRS multiplexing for MulteFire CCs. When the SRS multiplexing is performed with multiple SRS symbols in the downlink partial ending subframe (Uplink Pilot Time Slot (UpPTS)) region of the switched carrier, time-domain Orthogonal Cover Codes (OCCs) may be used to pack group D1 and D2 UEs on the same uplink interlace. For four symbols, this OCC can be defined as a set of four configurations:

$$w \in \{[1, 1, 1, 1], [1, 1, -1, -1], [1, -1, 1, -1], [1, -1, -1, 1]\}.$$

In addition to time-domain OCC, intra-symbol frequency-domain OCC and cyclic shifts may also be used to multiplex group D1 and D2 UEs on the same uplink interlace. For a single SRS symbol transmission in an uplink subframe, intra-symbol frequency-domain OCC and cyclic shifts may also be used to multiplex group D1 and D2 UEs on the same uplink interlace. Alternatively, group D1 and group D2 UEs may be assigned different uplink interlaces. This way, D2 UEs may transmit any uplink channel/reference signal such as PUSCH, PUCCH, or SRS in the same subframe as the switched SRS transmissions from group D1 UEs without mutual interference.

Figure 11:
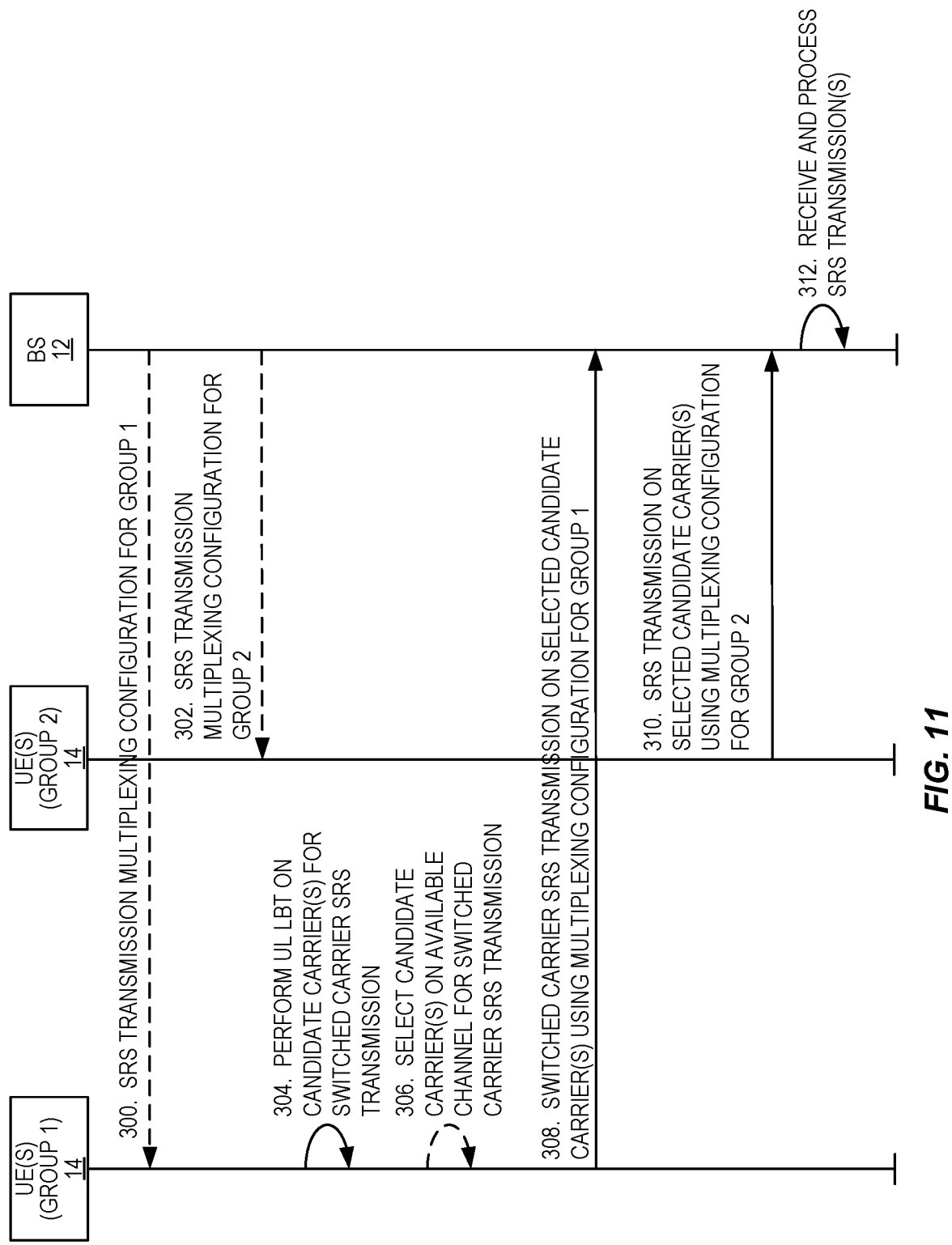
FIG. 11 illustrates one example of multiplexing of switched SRS transmissions from different groups of UEs according to some embodiments of the present disclosure.

FIG. 11 illustrates one example of multiplexing of switched SRS transmissions from different groups of UEs 14 according to some embodiments of the present disclosure. Optional steps are illustrated by dashed lines. Also, unless otherwise explicitly stated or otherwise required, the steps may be performed in any order. As illustrated, the base station 12 optionally configures a first group of UEs 14 with an SRS transmission multiplexing configuration for the first group of UEs 14 (group 1 or D1) (step 300) and optionally configures a second group of UEs 14 with an SRS transmission multiplexing configuration for the second group of UEs 14 (group 2 or D2) (step 302), as described above. The UE(s) 14 in the first group perform uplink LBT on one or more candidate carrier(s) for switched carrier SRS transmission (step 304). In particular, the UE(s) 14 may perform single carrier uplink LBT (i.e., uplink LBT on a single carrier) or multi-carrier uplink LBT, e.g., as described above. Optionally, the UE(s) 14 selects one (or potentially multiple) candidate carrier(s) that is(are) available for switched carrier SRS transmission (step 306). The UE(s) 14 perform switched carrier SRS transmission on the (selected) candidate carrier(s) determined to be available using the SRS transmission multiplexing configuration for group 1 (step 308). UE(s) 14 in the second group multiplex their SRS transmission on the same carrier(s) using the SRS transmission configuration for group 2 (step 310). In other words, using the different SRS transmission configurations, the UEs 14 in the first and second groups are able to multiplex their SRS transmissions on the same carrier(s). The base station 12 receives and processes the SRS transmissions from the UEs 14 in the first and second groups of UEs (step 312).

In some embodiments, mechanisms for indication of SRS switching opportunity by the base station 12 (e.g., eNB) are provided. The following are various aspects and parameters that may be signaled by the base station 12 either dynamically on the C-PDCCH or Physical Hybrid Automatic Repeat Request Indicator Channel (PHICH), or via higher-layer signaling, for SCBS operation on unlicensed carriers:

- The indication of which specific subframe to attempt SCBS on one or more switched carriers is broadcast dynamically, e.g., in the C-PDCCH sent on downlink subframes in LAA and MulteFire (as also described above).
- The number of contiguous SRS symbols that shall be transmitted (e.g., 1, 2, 3, or 4 symbols) when switching is performed on MulteFire CCs in a downlink partial ending subframe.
- The set of CCs on which to attempt SRS switching.
- The uplink interlace(s) on which the switched SRSs shall be transmitted.
- The CW or CCA duration to be used for uplink LBT for switched SRSs.
- If uplink LBT can be skipped prior to SRS transmission on the switched carrier.
- If SRS switching should be triggered or deferred to the next periodic opportunity.

Figure 12:
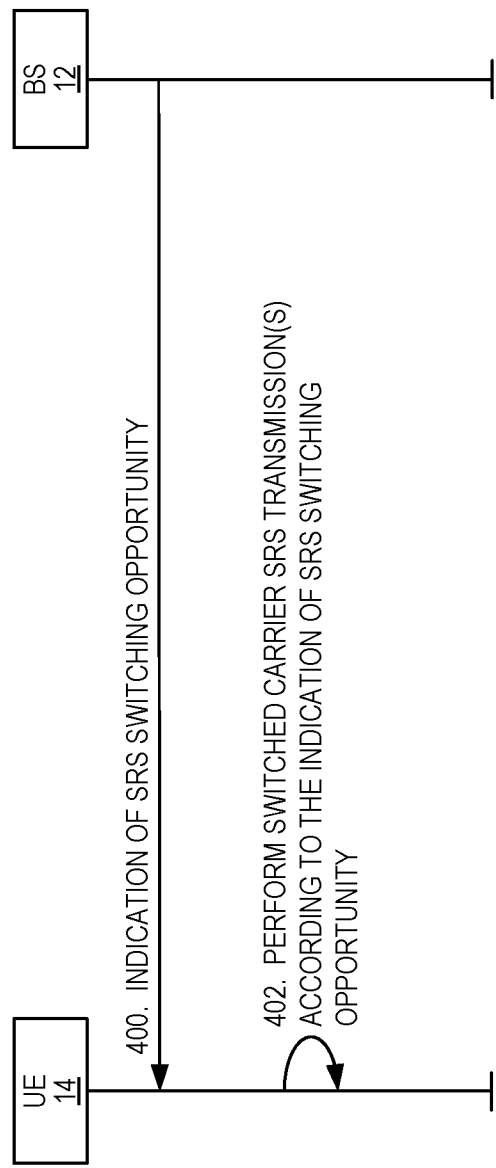
FIG. 12 illustrates mechanisms for indication of an SRS switching opportunity by the base station according to one embodiment of the present disclosure.

FIG. 12 illustrates one example of this embodiment. As illustrated, the base station 12 transmits an indication of SRS switching opportunity to the UE 14 (step 400). The indication may be any one or any combination of the examples given above. The UE 14 performs switched carrier SRS transmission(s) according to the received indication (step 402).

The present disclosure describes how to implement SRS carrier based switching on carriers in unlicensed spectrum. Solutions for both eLAA and MulteFire are presented.

Figure 13:
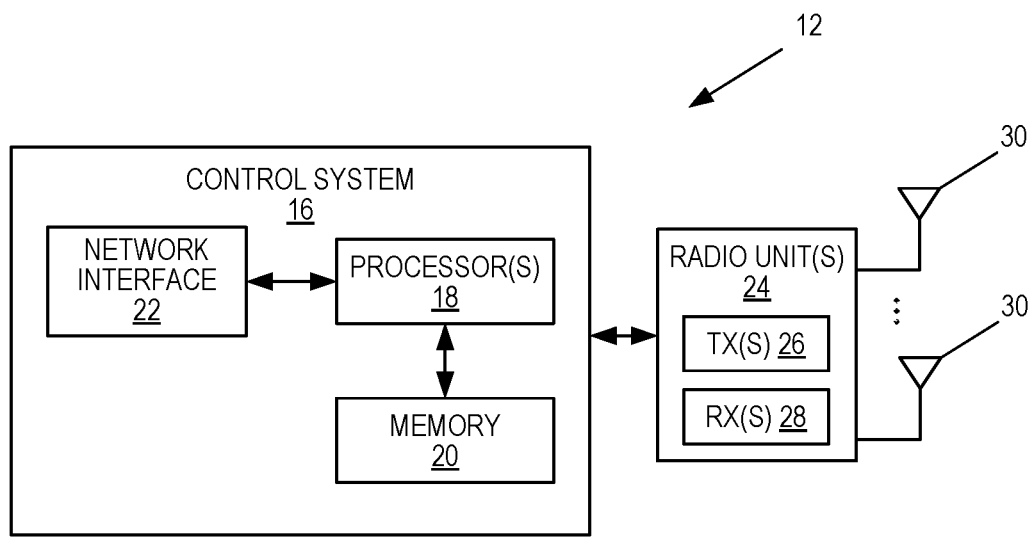
FIGS. 13 through 15 illustrate various embodiments of a base station.

FIG. 13 is a schematic block diagram of the base station 12 according to some embodiments of the present disclosure. As illustrated, the base station 12 includes a control system 16 that includes one or more processors 18 (e.g., Central Processing Units (CPUs), Application Specific Integrated Circuits (ASICs), Field Programmable Gate Arrays (FPGAs), and/or the like), memory 20, and a network interface 22. In addition, the base station 12 includes one or more radio units 24 that each includes one or more transmitters 26 and one or more receivers 28 coupled to one or more antennas 30. In some embodiments, the radio unit(s) 24 is external to the control system 16 and connected to the control system 16 via, e.g., a wired connection (e.g., an optical cable). However, in some other embodiments, the radio unit(s) 24 and potentially the antenna(s) 30 are integrated together with the control system 16. The one or more processors 18 operate to provide one or more functions of a base station 12 as described herein. In some embodiments, the function(s) are implemented in software that is stored, e.g., in the memory 20 and executed by the one or more processors 18.

Figure 14:
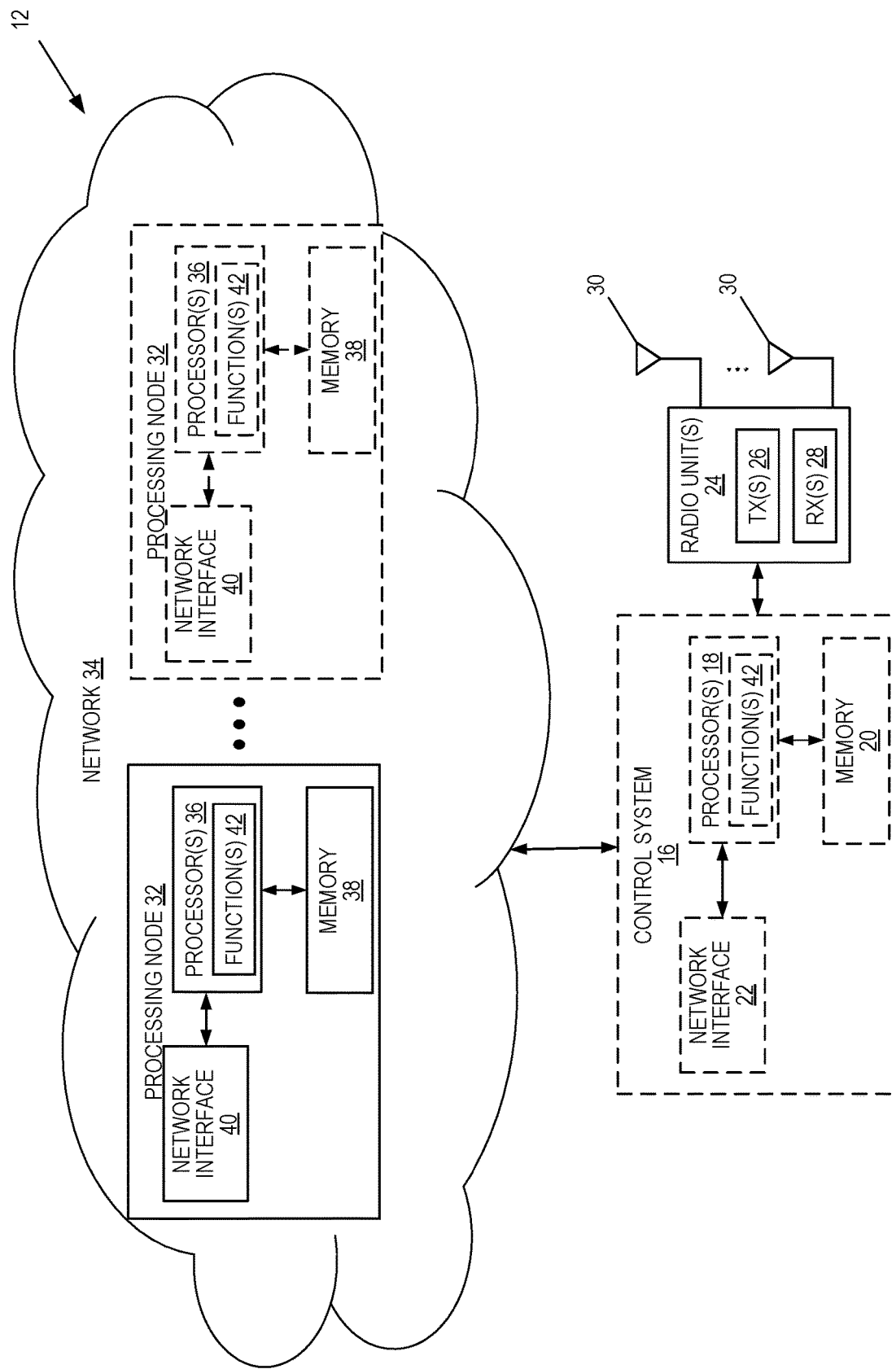

FIG. 14 is a schematic block diagram that illustrates a virtualized embodiment of the base station 12 according to some embodiments of the present disclosure. This discussion is equally applicable to other types of network nodes. Further, other types of network nodes may have similar virtualized architectures.

As used herein, a "virtualized" base station 12 is an implementation of the base station 12 in which at least a portion of the functionality of the base station 12 is implemented as a virtual component(s) (e.g., via a virtual machine(s) executing on a physical processing node(s) in a network(s)). As illustrated, in this example, the base station 12 includes the control system 16 (optional) that includes the one or more processors 18 (e.g., CPUs, ASICs, FPGAs, and/or the like), the memory 20, and the network interface 22 and the one or more radio units 24 that each includes the one or more transmitters 26 and the one or more receivers 28 coupled to the one or more antennas 30, as described above. The control system 16 is connected to the radio unit(s) 24 via, for example, an optical cable or the like. The control system 16 is connected to one or more processing nodes 32 coupled to or included as part of a network(s) 34 via the network interface 22. Each processing node 32 includes one or more processors 36 (e.g., CPUs, ASICs, FPGAs, and/or the like), memory 38, and a network interface 40.

In this example, functions 42 of the base station 12 described herein are implemented at the one or more processing nodes 32 or distributed across the control system 16 and the one or more processing nodes 32 in any desired manner. In some particular embodiments, some or all of the functions 42 of the base station 12 described herein are implemented as virtual components executed by one or more virtual machines implemented in a virtual environment(s) hosted by the processing node(s) 32. As will be appreciated by one of ordinary skill in the art, additional signaling or communication between the processing node(s) 32 and the control system 16 is used in order to carry out at least some of the desired functions 42. Notably, in some embodiments, the control system 16 may not be included, in which case the radio unit(s) 24 communicate directly with the processing node(s) 32 via an appropriate network interface(s).

In some embodiments, a computer program including instructions which, when executed by at least one processor, causes the at least one processor to carry out the functionality of a base station 12 or a node (e.g., a processing node 32) implementing one or more of the functions 42 of the base station 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
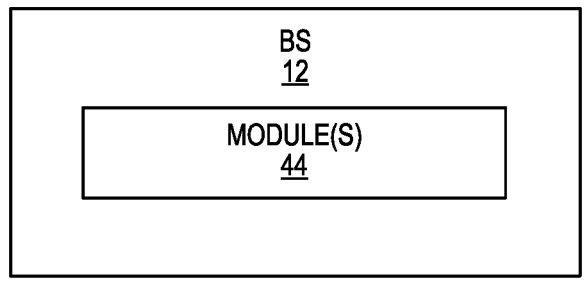

FIG. 15 is a schematic block diagram of the base station 12 according to some other embodiments of the present disclosure. The base station 12 includes one or more modules 44, each of which is implemented in software. The module(s) 44 provide the functionality of the base station 12 described herein. This discussion is equally applicable to the processing node 32 of FIG. 14 where the modules 44 may be implemented at one of the processing nodes 32 or distributed across multiple processing nodes 32 and/or distributed across the processing node(s) 32 and the control system 16.

Figure 16:
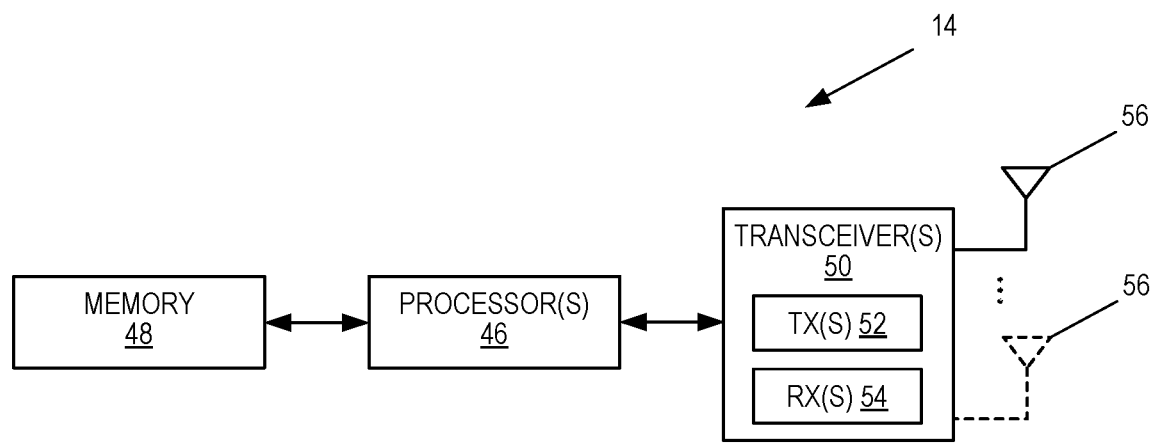
FIGS. 16 and 17 illustrate various embodiments of a UE.

FIG. 16 is a schematic block diagram of a UE 14 according to some embodiments of the present disclosure. As illustrated, the UE 14 includes one or more processors 46 (e.g., CPUs, ASICs, FPGAs, and/or the like), memory 48, and one or more transceivers 50 each including one or more transmitters 52 and one or more receivers 54 coupled to one or more antennas 56. In some embodiments, the functionality of the UE 14 described above may be fully or partially implemented in software that is, e.g., stored in the memory 48 and executed by the processor(s) 46.

In some embodiments, a computer program including instructions which, when executed by at least one processor, causes the at least one processor to carry out the functionality of the UE 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
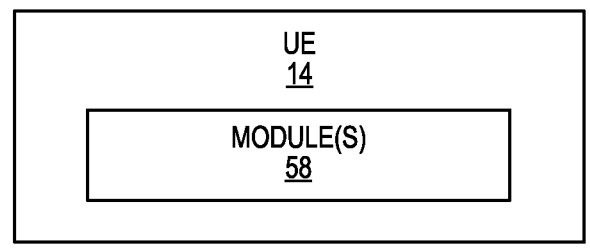

FIG. 17 is a schematic block diagram of the UE 14 according to some other embodiments of the present disclosure. The UE 14 includes one or more modules 58, each of which is implemented in software. The module(s) 58 provide the functionality of the UE 14 described herein.

While not being limited thereto, some example embodiments of the present disclosure are provided below.

FIRST EMBODIMENT

A method of operation of a UE (14) in a wireless system (10) comprises performing (104, 202, 304) uplink LBT on one or more candidate carriers for switched carrier SRS transmission, and performing (106, 206, 308) a switched carrier SRS transmission on at least one candidate carrier of the one or more candidate carriers that is determined to be available as a result of performing (104, 202, 304) the uplink LBT on the one or more candidate carriers.

SECOND EMBODIMENT

The first embodiment wherein the one or more candidate carriers are carriers other than carriers configured for the UE (14) and on which the UE (14) is scheduled to transmit.

THIRD EMBODIMENT

The first or second embodiment wherein performing (104, 202, 304) the uplink LBT on the one or more candidate carriers for switched carrier SRS transmission comprises performing (104) the uplink LBT on a candidate carrier, a result of the uplink LBT being that the candidate carrier is available; and performing (106, 206, 308) the switched carrier SRS transmission on the at least one candidate carrier comprises performing (106) the switched carrier SRS transmission on the candidate carrier in response to the result of the uplink LBT being that the candidate carrier is available.

FOURTH EMBODIMENT

The first or second embodiment wherein performing (104, 202, 304) the uplink LBT on the one or more candidate carriers for switched carrier SRS transmission comprises performing (202) multi-carrier uplink LBT on a first set of carriers for which the UE (14) is granted uplink transmission and a second set of carriers comprising the one or more candidate carriers; and wherein the at least one candidate carrier on which the UE (14) performs switched carrier SRS transmission comprises at least one candidate carrier from the one or more candidate carriers in the second set of carriers.

FIFTH EMBODIMENT

Any one of the first through fourth embodiments wherein performing (106, 206, 308) the switched carrier SRS transmission on the at least one candidate carrier comprises performing (308) the switched carrier SRS transmission on the at least one candidate carrier in accordance with an SRS transmission multiplexing configuration for a respective group of UEs (14) such that the switched carrier SRS transmission on the at least one candidate carrier is multiplexed with SRS transmission of another group of UEs (14) on the same at least one carrier.

SIXTH EMBODIMENT

A UE (14) for a wireless system (10), the UE (14) adapted to perform uplink LBT on one or more candidate carriers for switched carrier SRS transmission, and perform a switched carrier SRS transmission on at least one candidate carrier of the one or more candidate carriers that is determined to be available as a result of performing the uplink LBT on the one or more candidate carriers.

SEVENTH EMBODIMENT

The sixth embodiment wherein the UE (14) is further adapted to operate according to the method of any one of the second through fifth embodiments.

EIGHTH EMBODIMENT

A UE (14) for a wireless system (10) comprising at least one transceiver (50), at least one processor (46), and memory (48) comprising instructions executable by the at least one processor (46) whereby the UE (14) is operable to perform uplink LBT on one or more candidate carriers for switched carrier SRS transmission and perform a switched carrier SRS transmission on at least one candidate carrier of the one or more candidate carriers that is determined to be available as a result of performing the uplink LBT on the one or more candidate carriers.

NINTH EMBODIMENT

A UE (14) for a wireless system (10) comprising an uplink LBT module (58) operable to perform uplink LBT on one or more candidate carriers for switched carrier SRS transmission and a switched carrier SRS transmission module (58) operable to perform a switched carrier SRS transmission on at least one candidate carrier of the one or more candidate carriers that is determined to be available as a result of performing the uplink LBT on the one or more candidate carriers.

The following acronyms are used throughout this disclosure.

μs Microsecond
3GPP Third Generation Partnership Project
5G Fifth Generation
ASIC Application Specific Integrated Circuit
CC Component Carrier
CCA Clear Channel Assessment
CN Core Network
C-PDCCH Common Physical Downlink Control Channel
CPU Central Processing Unit
CW Contention Window
dBm Decibel-Milliwatt
B-IFDMA Block-Interleaved Frequency Division Multiple Access
DFT Discrete Fourier Transform
DMRS Demodulation Reference Signal
eLAA Enhanced License Assisted Access
eNB Enhanced or Evolved Node B
FDMA Frequency Division Multiple Access
FPGA Field Programmable Gate Array
GHz Gigahertz
LAA License Assisted Access
LBT Listen-Before-Talk
LTE Long Term Evolution
LTE-U Long Term Evolution Unlicensed
MHz Megahertz
MME Mobility Management Entity
ms Millisecond
MTC Machine Type Communication
NR New Radio
OCC Orthogonal Cover Code
OFDM Orthogonal Frequency Division Multiplexing
PCell Primary Cell
PDN Packet Data Network
PDSCH Physical Downlink Shared Channel
P-GW Packet Data Network Gateway
PHICH Physical Hybrid Automatic Repeat Request Indicator Channel
PRACH Physical Random Access Channel
PRB Physical Resource Block
PSD Power Spectral Density
PUCCH Physical Uplink Control Channel
PUSCH Physical Uplink Shared Channel
RB Resource Block
RE Resource Element
Rel Release
SCBS Sounding Reference Signal Carrier Based Switching
SCell Secondary Cell
SCEF Service Capability Exposure Function
SC-FDMA Single-Carrier Frequency Division Multiple Access
SI System Information
sPUCCH Short Physical Uplink Control Channel
SRS Sounding Reference Signal
TDD Time Division Duplexing
TTI Transmit Time Interval
UE User Equipment
UpPTS Uplink Pilot Time Slot
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a User Equipment device, UE, in a wireless system, comprising:
   prior to performing uplink Listen-Before-Talk, LBT, on one or more candidate carriers, starting an uplink transmission on one or more carriers for which the UE is granted the uplink transmission;
   suspending the uplink transmission on the one or more carriers for which the UE is granted the uplink transmission;
   performing the uplink LBT on the one or more candidate carriers for switched carrier Sounding Reference Signal, SRS, transmission, wherein the one or more candidate carriers are different from the one or more carriers for which the UE is granted the uplink transmission; and
   performing a switched carrier SRS transmission on at least one candidate carrier of the one or more candidate carriers that is determined to be available as a result of performing the uplink LBT on the one or more candidate carriers; and
   resuming the uplink transmission after performing the switched carrier SRS transmission and upon a result of an uplink LBT performed on the one or more carriers for which the UE is granted the uplink transmission indicating the one or more carriers are available.

2. The method of claim 1 wherein the one or more candidate carriers are carriers other than carriers configured for the UE and on which the UE is scheduled to transmit.

3. The method of claim 1 wherein:
   performing the uplink LBT on the one or more candidate carriers for switched carrier SRS transmission comprises performing the uplink LBT on a candidate carrier, a result of the uplink LBT being that the candidate carrier is available; and
   performing the switched carrier SRS transmission on the at least one candidate carrier comprises performing the switched carrier SRS transmission on the candidate carrier in response to the result of the uplink LBT being that the candidate carrier is available.

4. The method of claim 3 wherein:
   prior to performing the uplink LBT on the candidate carrier, starting the uplink transmission comprises starting the uplink transmission on a first carrier, the first carrier being different than the candidate carrier.

5. The method of claim 1 wherein:
   performing the uplink LBT on the one or more candidate carriers for switched carrier SRS transmission comprises performing multi-carrier uplink LBT on a first set of carriers for which the UE is granted the uplink transmission and a second set of carriers comprising the one or more candidate carriers, the first set of carriers and the second set of carriers being disjoint sets; and
   wherein the at least one candidate carrier on which the UE performs switched carrier SRS transmission comprises at least one candidate carrier from the one or more candidate carriers in the second set of carriers.

6. The method of claim 5 wherein performing multi-carrier uplink LBT on the first set of carriers for which the UE is granted the uplink transmission and the second set of carriers comprising the one or more candidate carriers comprises suspending the uplink transmission on at least one of the carriers in the first set of carriers prior to transmitting SRS on the at least one candidate carrier.

7. The method of claim 5 wherein performing multi-carrier uplink LBT on the first set of carriers for which the UE is granted the uplink transmission and the second set of carriers comprising the one or more candidate carriers comprises suspending the uplink transmission on all of the carriers in the first set of carriers prior to transmitting SRS on the at least one candidate carrier.

8. The method of claim 1 wherein performing the switched carrier SRS transmission on the at least one candidate carrier comprises performing the switched carrier SRS transmission on the at least one candidate carrier in accordance with an SRS transmission multiplexing configuration for a respective group of UEs such that the switched carrier SRS transmission on the at least one candidate carrier is multiplexed with uplink transmissions of another group of UEs on the same at least one candidate carrier.

9. The method of claim 1 wherein performing the switched carrier SRS transmission on the at least one candidate carrier comprises performing the switched carrier SRS transmission on the at least one candidate carrier in accordance with an SRS transmission multiplexing configuration for a respective group of UEs such that the switched carrier SRS transmission on the at least one candidate carrier is multiplexed with SRS transmission of another group of UEs on the same at least one candidate carrier.

10. The method of claim 9 wherein the switched carrier SRS transmissions of the respective group of UEs are multiplexed with the SRS transmissions of another group of UEs in a particular symbol of a same subframe on the same at least one candidate carrier.

11. The method of claim 9 wherein the switched carrier SRS transmissions of the respective group of UEs are multiplexed with the SRS transmissions of another group of UEs using different time-domain Orthogonal Cover Codes, OCCs.

12. The method of claim 9 wherein the switched carrier SRS transmissions of the respective group of UEs are multiplexed with the SRS transmissions of another group of UEs using different time-domain Orthogonal Cover Codes, OCCs, and different intra-symbol frequency-domain OCCs and cyclic shifts.

13. A User Equipment device, UE, for a wireless system, comprising:
   at least one processor; and
   memory comprising instructions executable by the at least one processor whereby the UE is operable to:
      prior to performing uplink Listen-Before-Talk, LBT, on one or more candidate carriers, start an uplink transmission on one or more carriers for which the UE is granted the uplink transmission;
      suspend the uplink transmission on the one or more carriers for which the UE is granted the uplink transmission;
      perform the uplink LBT on the one or more candidate carriers for switched carrier Sounding Reference Signal, SRS, transmission, wherein the one or more candidate carriers are different from the one or more carriers for which the UE is granted the uplink transmission; and
      perform a switched carrier SRS transmission on at least one candidate carrier of the one or more candidate carriers that is determined to be available as a result of performing the uplink LBT on the one or more candidate carriers; and resume the uplink transmission after performing the switched carrier SRS transmission and upon a result of an uplink LBT performed on the one or more carriers for which the UE is granted the uplink transmission indicating the one or more carriers are available.

14. The UE of claim 13 wherein the one or more candidate carriers are carriers other than carriers configured for the UE and on which the UE is scheduled to transmit.

15. The UE of claim 13 wherein:
the one or more candidate carriers comprise a candidate carrier; and
the UE is further operable to:
    perform the uplink LBT on the candidate carrier, a result of the uplink LBT being that the candidate carrier is available; and
    perform the switched carrier SRS transmission on the candidate carrier in response to the result of the uplink LBT being that the candidate carrier is available.

16. The UE of claim 15 wherein:
the one or more carriers for which the UE is granted the uplink transmission comprise a first carrier, the first carrier being different than the candidate carrier; and
the UE is further operable to:
    prior to performing the uplink LBT on the candidate carrier, start the uplink transmission on the first carrier.

17. The UE of claim 13 wherein:
in order to perform the uplink LBT on the one or more candidate carriers for switched carrier SRS transmission, the UE is further operable to perform multi-carrier uplink LBT on a first set of carriers for which the UE is granted the uplink transmission and a second set of carriers comprising the one or more candidate carriers, the first set of carriers and the second set of carriers being disjoint sets; and
wherein the at least one candidate carrier on which the UE performs switched carrier SRS transmission comprises at least one candidate carrier from the one or more candidate carriers in the second set of carriers.

18. The UE of claim 17 wherein, in order to perform multi-carrier uplink LBT on the first set of carriers for which the UE is granted the uplink transmission and the second set of carriers comprising the one or more candidate carriers, the UE is further operable to suspend the uplink transmission on at least one of the carriers in the first set of carriers prior to transmitting SRS on the at least one candidate carrier.

19. The UE of claim 17 wherein, in order to perform multi-carrier uplink LBT on the first set of carriers for which the UE is granted the uplink transmission and the second set of carriers, the UE is further operable to comprise the one or more candidate carriers comprises suspending the uplink transmission on all of the carriers in the first set of carriers prior to transmitting SRS on the at least one candidate carrier.

20. The UE of claim 13 wherein, in order to perform the switched carrier SRS transmission on the at least one candidate carrier, the UE is further operable to perform the switched carrier SRS transmission on the at least one candidate carrier in accordance with an SRS transmission multiplexing configuration for a respective group of UEs such that the switched carrier SRS transmission on the at least one candidate carrier is multiplexed with uplink transmissions of another group of UEs on the same at least one candidate carrier.

21. The UE of claim 13 wherein, in order to perform the switched carrier SRS transmission on the at least one candidate carrier, the UE is further operable to perform the switched carrier SRS transmission on the at least one candidate carrier in accordance with an SRS transmission multiplexing configuration for a respective group of UEs such that the switched carrier SRS transmission on the at least one candidate carrier is multiplexed with SRS transmission of another group of UEs on the same at least one candidate carrier.

22. The UE of claim 21 wherein the switched carrier SRS transmissions of the respective group of UEs are multiplexed with the SRS transmissions of another group of UEs in a particular symbol of a same subframe on the same at least one candidate carrier.

23. The UE of claim 21 wherein the switched carrier SRS transmissions of the respective group of UEs are multiplexed with the SRS transmissions of another group of UEs using different time-domain Orthogonal Cover Codes, OCCs.

24. The UE of claim 21 wherein the switched carrier SRS transmissions of the respective group of UEs are multiplexed with the SRS transmissions of another group of UEs using different time-domain Orthogonal Cover Codes, OCCs, and different intra-symbol frequency-domain OCCs and cyclic shifts.

* * * * *